United States Patent Office 2,815,363
Patented Dec. 3, 1957

2,815,363

ALCOHOLIC α-HYDROXYPHENYLACRYLO-NITRILES

Kurt J. Rorig, Glenview, Ill., assignor to G. D. Searle & Co., Chicago, Ill., a corporation of Delaware No Drawing. Application February 13, 1956, Serial No. 564,879

6 Claims. (Cl. 260—465)

This invention relates to diarylacrylonitriles and processes for the manufacture thereof. Particularly, this invention relates to α-hydroxyphenylacrylonitriles distinguished by the presence of an alcoholic phenyl radical in the beta position, and having the formula

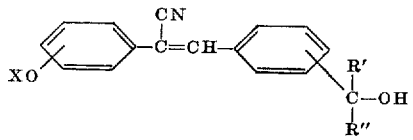

X being hydrogen or the residue of an organic acid, for example

and R, R', and R" being lower alkyl radicals.

Among the lower alkyl radicals comprehended by R, R', and R" in the foregoing structural formula are methyl, ethyl, propyl, isopropyl, butyl, isobutyl, secondary butyl, tertiary butyl, and like-$C_nH_{2n+1}$ radicals wherein $n$ is a positive integer of the order of 6 or less.

The alcoholic phenyl radical characteristic of the compounds here disclosed contributes to various useful pharmaceutical properties of the claimed compositions, especially their anti-iritic activity. Like cortisone, the subject compounds protect against the hyperemia associated with specific types of iritis, and are correspondingly valuable medicaments.

The compounds of this invention are relatively insoluble in water, but may be dissolved in alcohol, ethyl acetate, ether, dioxane, and other common organic solvents. The compounds may be administered as tablets or capsules; dissolved or suspended in aqueous media, they may be given parenterally.

Manufacture of the compounds to which this invention relates is preferably carried out as follows: A selected acrylonitrile of the formula

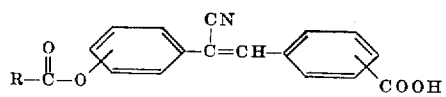

R being a lower alkyl radical, is converted to the corresponding acid chloride by interaction with—for example—thionyl chloride, the product in turn being reacted with an organometallic compound appropriately chosen from such as (lower alkyl)magnesium halide, di(lower alkyl)zinc, di(lower alkyl)cadmium, and the like to give one of the hereinafter claimed alcohols and acylated derivatives.

Where di(lower alkyl)cadmium is the organometallic reagent of choice, the reaction is completed stepwise, there being first produced the intermediate compound

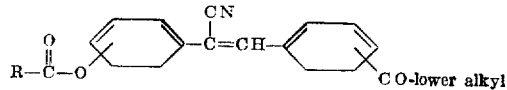

which is subjected to further treatment with di(lower alkyl)cadmium to give a claimed ester

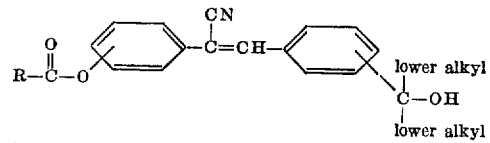

R being a lower alkyl radical throughout. Hydrolysis of the acyl groups represented may be effected by a variety of techniques, for example, transesterification with an excess of alcohol in the presence of sulfuric acid, heating with aqueous mineral acid, or letting stand in dilute aqueous-alcoholic sodium carbonate.

Alternatively, the intermediate β-alkanoylphenyl-α-alkanoyloxyphenylacrylonitriles depicted above may be reacted with a (lower alkyl)magnesium halide to produce a claimed phenol

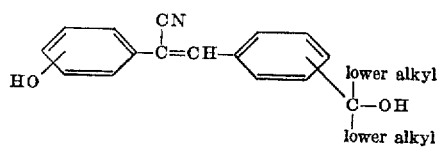

Where a phenolic product is desired (as distinguished from the corresponding esters), the acid chloride starting material hereinabove remarked is preferably reacted with a lower alkyl)magnesium halide, there being obtainable by this means an improved yield of product in essentially one step.

It will be recognized by those skilled in the art that the hydroxyisopropyl compounds of this invention are characterized by a tendency to lose water under the influence of acids or bases, with formation of corresponding isopropenyl derivatives, to wit

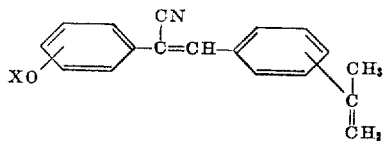

X being defined as above.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

*Example 1*

α - (p - Acetoxyphenyl) - β - [p - (2 - hydroxy - 2 - propyl)phenyl]-acrylonitrile.—To 14 parts of dimethylcadmium in 220 parts of dry benzene is added a warm solution of 8 parts of α-(p-acetoxyphenyl)-β-(p-chloroformylphenyl)-acrylonitrile in 440 parts of dry benzene. The reactants are heated at reflux temperatures for 1¾ hours, following which the reaction mixture is cooled to approximately 10° C. and then decomposed by cautious addition of 160 parts of 10% aqueous muriatic acid. The organic phase is separated, washed with water, dried over anhydrous calcium sulfate, and finally chromatographed on silica gel, using benzene and ethyl acetate as developing solvents. Preliminary elution with a mixture of 98 parts of benzene and 2 parts of ethyl acetate enables isolation in an eluate comprising 96 parts of benzene to 4 parts of ethyl acetate of a white crystalline substance, which, recrystallized from dilute aqueous methyl alcohol, melts at approximately 125–126° C. The product, obtained thus as lustrous, mica-like, colorless plates, is α-(p-acetoxyphenyl)-β-[p-(2-hydroxy-2-propyl)phenyl]-acrylonitrile and has the formula

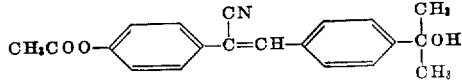

Example 2

α - (p - Hydroxyphenyl) - β - [p - (2 - hydroxy - 2 - propyl)phenyl]acrylonitriles.—To 3 parts of α-(p-acetoxyphenyl)-β-(p-acetylphenyl)acrylonitrile in a mixture of 440 parts of benzene and 285 parts of ether is added 2 parts of methylmagnesium bromide in 7 parts of ether, all materials being free of water and the reaction being carried out in an inert atmosphere. The reactants are maintained at room temperatures for 2 hours, then heated at reflux temperatures for 20 minutes, there being vigorous agitation the while. The reaction is quenched by cautious addition of saturated aqueous ammonium chloride, following which the organic phase is separated and evaporated to dryness. The residue is chromatographed on silica gel, using benzene and ethyl acetate as developing solvents. Following preliminary elution with mixtures comprising up to 5 parts of ethyl acetate for each 95 parts of benzene, there is obtained with 10% ethyl acetate and 90% benzene an eluate which, evaporated to dryness, yields the desired α-(p-hydroxyphenyl)-β-[p-(2-hydroxy-2-propyl)phenyl]acrylonitrile as a residue. Purification is achieved by recrystallization from a mixture of methanol and benzene. The product, shiny ivory needles melting at 180–182° C. with some previous softening, has the formula

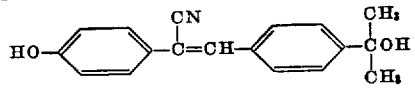

Example 3

A. α - (o - Butyroxyphenyl) - β - (m - chloroformylphenyl)-acrylonitrile.—A mixture of 11 parts of α-(o-butyroxyphenyl) - β - (m-carboxyphenyl)acrylonitrile, 2400 parts of thiophene-free benzene, 80 parts of thionyl chloride, and 1 part of pyridine is heated at the boiling point for 3 hours and then freed of excess thionyl chloride, benzene, and pyridine by vacuum distillation at approximately 90° C. The residue is α-(o-butyroxyphenyl)-β-(m-chloroformylphenyl)acrylonitrile suitable as a starting material for the procedure of Part B of this example without further processing. The product has the formula

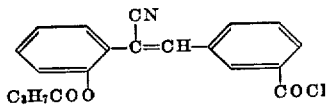

B. α - (o - Hydroxyphenyl) - β - [m - (2 - hydroxy-2 - propyl)phenyl]acrylonitrile.—To 15 parts of methylmagnesium bromide in 55 parts of ether is added 11 parts of α-(o-butyroxyphenyl)-β-(m-chloroformylphenyl)-acrylonitrile in a mixture of 600 parts of benzene and 325 parts of ether, all materials being free of moisture and protected by a nitrogen atmosphere. The reactants are maintained with agitation at the boiling point for 3 hours, whereupon decomposition of the organo-metallic complex formed in process is accomplished with saturated aqueous ammonium chloride. Subsequent evaporation of the ether-benzene layer which separates on standing affords α-(o-hydroxyphenyl)-β-[m-(2-hydroxy-2-propyl)phenyl]acrylonitrile, which is further purified by chromatographic adsorption on silica gel, using benzene and ethyl acetate as developing solvents. The product has the formula

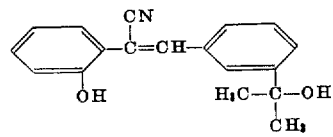

Example 4

α - (p -Hydroxyphenyl) - β - [p - (2 - hydroxy - 2 - propyl)phenyl]acrylonitrile.—Hydrolysis of the acetoxy compound described in Example 1 above is accomplished by treating 10 parts thereof in 85 parts of methyl alcohol with 3 parts of sodium carbonate dissolved in a mixture of 15 parts of water and 190 parts of methyl alcohol, the reaction being completed after approximately 1 hour at room temperature. The product is identical with that obtained by the procedure of Example 2.

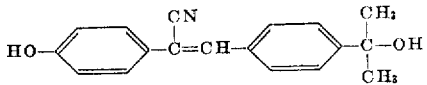

What is claimed is:

1. A product of the formula

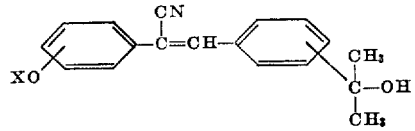

wherein X is selected from the group consisting of hydrogen and the residue of an organic acid represented by

R being a lower alkyl radical.

2. A compound of the formula

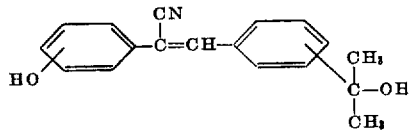

3. α - (p - Hydroxyphenyl)-β-[p-(2-hydroxy-2-propyl)phenyl]acrylonitrile.

4. α- (o - Hydroxyphenyl)-β-[m-(2-hydroxy-2-propyl)phenyl]acrylonitrile.

5. A compound of the formula

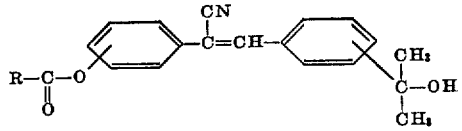

wherein R is a lower alkyl radical.

6. α - (p - Actetoxyphenyl)-β-[p-(2-hydroxy-2-propyl)phenyl]acrylonitrile.

References Cited in the file of this patent

UNITED STATES PATENTS 2,681,359    Rorig  --------------- June 15, 1954

UNITED STATES PATENT OFFICE
Certificate of Correction

Patent No. 2,815,363

December 3, 1957

Kurt J. Rorig

It is hereby certified that error appears in the printed specification of the above numbered patent requiring correction and that the said Letters Patent should read as corrected below.

Column 1, last formula therein should appear as shown below instead of as in the patent— column 2, line 29, for "lower alkyl)" read —(lower alkyl)—; column 3, line 15, Example 2, for "*acrylonitriles*" read —*acrylonitrile*—.

Signed and sealed this 25th day of March 1958.

[SEAL]

Attest:
KARL H. AXLINE,
*Attesting Officer.*

ROBERT C. WATSON,
*Commissioner of Patents.*